United States Patent
Farrel et al.

(10) Patent No.: US 11,603,872 B2
(45) Date of Patent: Mar. 14, 2023

(54) SHEET METAL CORNER HEM INTERLOCK

(71) Applicant: Haier US Appliance Solutions, Inc., Wilmington, DE (US)

(72) Inventors: Caleb Farrel, Jeffersonville, IN (US); Joshua Adam Mayne, Charlestown, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 35 days.

(21) Appl. No.: 17/177,332

(22) Filed: Feb. 17, 2021

(65) Prior Publication Data

US 2022/0260100 A1 Aug. 18, 2022

(51) Int. Cl.
*F16B 5/00* (2006.01)
*B21D 39/02* (2006.01)

(52) U.S. Cl.
CPC ............ *F16B 5/0012* (2013.01); *B21D 39/02* (2013.01); *F16B 5/0096* (2013.01); *Y10T 403/4991* (2015.01)

(58) Field of Classification Search
CPC ..... B21D 39/02; B21D 39/021; F16B 5/0012; F16B 5/0084; F16B 5/0096; F16B 17/008; F24C 15/02; F25D 23/062; F25D 23/063; F25D 2323/06; Y10T 403/49; Y10T 403/4991; Y10T 403/7096; Y10T 403/73
USPC .................. 403/274, 285, 382, 403; 312/406
See application file for complete search history.

(56) References Cited

U.S. PATENT DOCUMENTS

| | | | | |
|---|---|---|---|---|
| 1,557,066 A * | 10/1925 | Krantz | ................... | H02G 3/081 220/3.94 |
| 3,169,518 A * | 2/1965 | Scott | ..................... | A47B 77/08 126/39 R |
| 3,708,103 A * | 1/1973 | Evans | .................... | B65D 5/302 229/196 |
| 4,313,555 A * | 2/1982 | Sieffert | .................. | B65D 5/302 229/125.19 |
| 4,981,217 A * | 1/1991 | Lim | ........................ | A47G 23/06 224/567 |
| 5,402,932 A * | 4/1995 | Fadaie | ................... | B65D 5/302 229/197 |
| 5,711,478 A * | 1/1998 | Turecek | ................... | B65D 5/68 229/125.19 |
| 8,733,573 B2 * | 5/2014 | Lucht | ....................... | B65D 7/30 220/62.1 |
| 10,113,749 B2 * | 10/2018 | Yancey | ................... | F24C 15/02 |
| 10,208,961 B2 | 2/2019 | Meyer | | |
| 10,520,242 B2 | 12/2019 | Denison | | |
| 2017/0016625 A1 | 1/2017 | Meyer | | |

FOREIGN PATENT DOCUMENTS

| | | | |
|---|---|---|---|
| JP | 8103835 A | 4/1996 | |
| JP | 4536974 B2 | 9/2010 | |

* cited by examiner

*Primary Examiner* — Josh Skroupa
(74) *Attorney, Agent, or Firm* — Dority & Manning, P.A.

(57) ABSTRACT

A panel assembly including a main panel, a first side panel, a second side panel, a first tab, a second tab, and an extension. The first tab defines a planar notch into which the extension is positioned to restrict movement of the first side panel and the second side panel.

18 Claims, 7 Drawing Sheets

SHEET METAL CORNER HEM INTERLOCK

FIELD OF THE INVENTION

The present subject matter relates generally to panel assemblies, and more particularly to panel assemblies and formation methods that do not require secondary joining procedures.

BACKGROUND OF THE INVENTION

Panel assemblies are utilized during the assembly of many components, and typically form the outer surfaces of the components. A panel assembly accordingly includes a number of panels which can form the various outer surfaces of the resulting component. For example, a panel assembly can include an outer surface and one or more side surfaces that are generally perpendicular to the outer surface. One particular application of panel assemblies is in the assembly of doors, such as for appliances. Oven appliance doors, for example, utilize panel assemblies to form the outer surface and various side surfaces thereof.

In many cases, such as in the case of sheet-metal panel assemblies, the panel assemblies are provided for assembly in unformed "blanks" which include the various panels thereof. The panels must then be bent into the proper shape and fastened together using a secondary joining process such as welding, brazing, or connecting with suitable mechanical fasteners. However, such use of secondary joining processes is both expensive and time consuming, thus increasing the overall cost of the resulting component and the overall manufacturing time for the component.

Accordingly, improved panel assemblies and methods for forming such panel assemblies are desired. In particular, panel assemblies and associated methods which provide time and cost savings, and which do not require a secondary joining process, would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a panel assembly is provided. The panel assembly may include a main panel extending within a plane which defines an X-axis and a Y-axis perpendicular to the X-axis; a first side panel extending from the main panel along a Z-axis perpendicular to the X-axis and the Y-axis; a second side panel extending from the main panel along the Z-axis, the second side panel perpendicular to the first side panel; a first tab extending from the first side panel along the X-axis and comprising a first portion, a second portion, and a third portion, the first, second, and third portions lying in the same plane and collectively defining a notch; a second tab extending from the second side panel along the Y-axis; and an extension extending from the second tab in the Y-axis direction, the extension interlocking with the notch.

In another exemplary aspect of the present disclosure, a method of forming a panel assembly is disclosed. The unformed panel assembly may include a main panel, a first side panel, and a second side panel, the unformed panel assembly further comprising a first tab extending from the first side panel, the first tab comprising a first portion extending from the first side panel, a second portion extending from the first portion, and a third portion extending from the second portion, the unformed panel assembly further comprising a second tab extending from the second side panel, the second tab comprising an extension extending from the second tab along the Y-axis. The method may include receiving the unformed panel assembly; bending the extension 180° such that the extension overlaps with the second tab; bending the first tab such that the first tab extends from the first side panel along a Z-axis perpendicular to the X-axis and the Y-axis; bending the second tab such that the second tab extends from the second side panel along the Z-axis; bending the first side panel such that the first side panel extends from the main panel along the Z-axis; and bending the second side panel such that the second side panel extends from the main panel along the Z-axis and the extension is positioned between the first portion, the second portion, and the third portion of the first tab.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
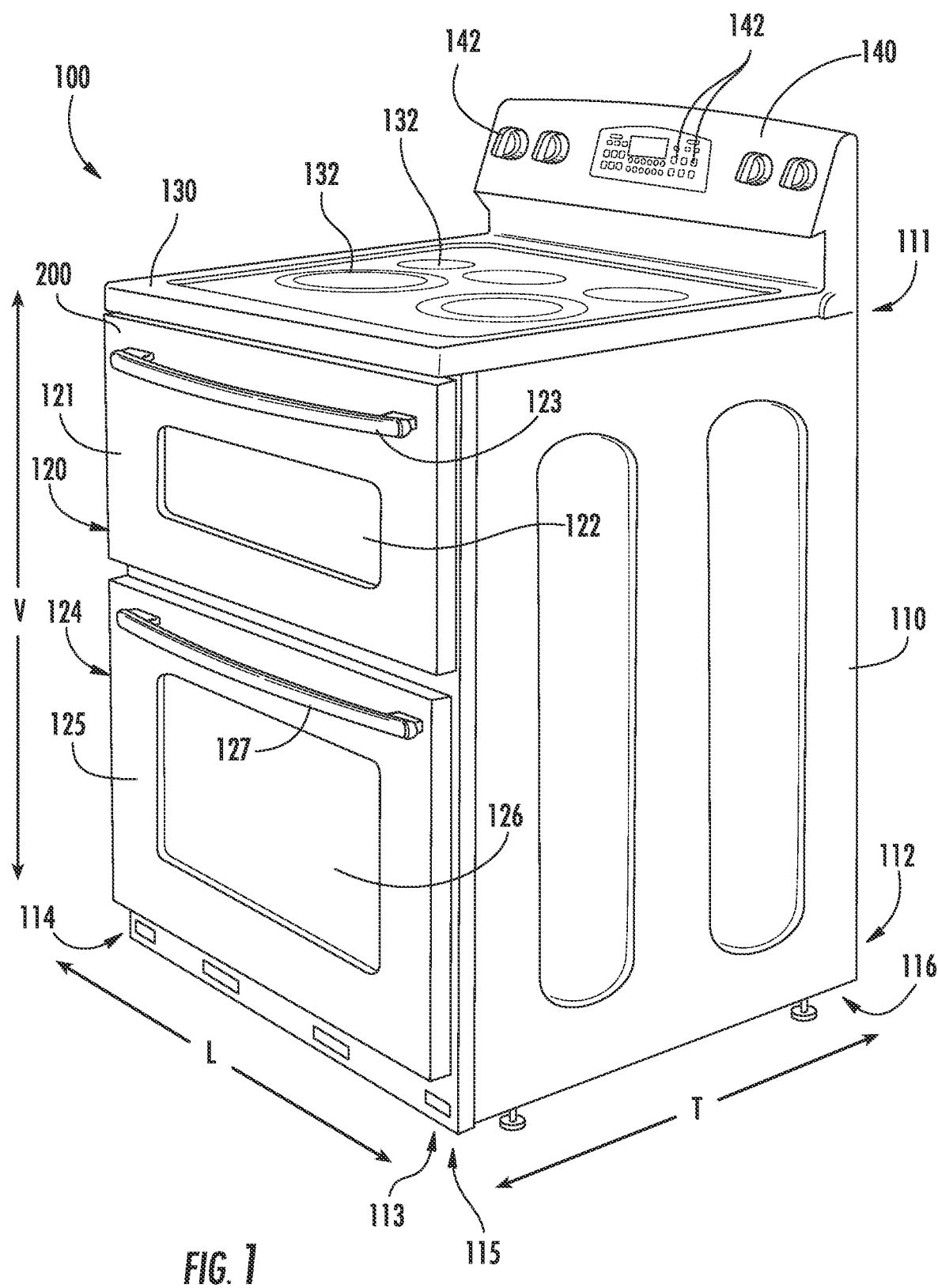
FIG. 1 is a perspective view of an oven appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
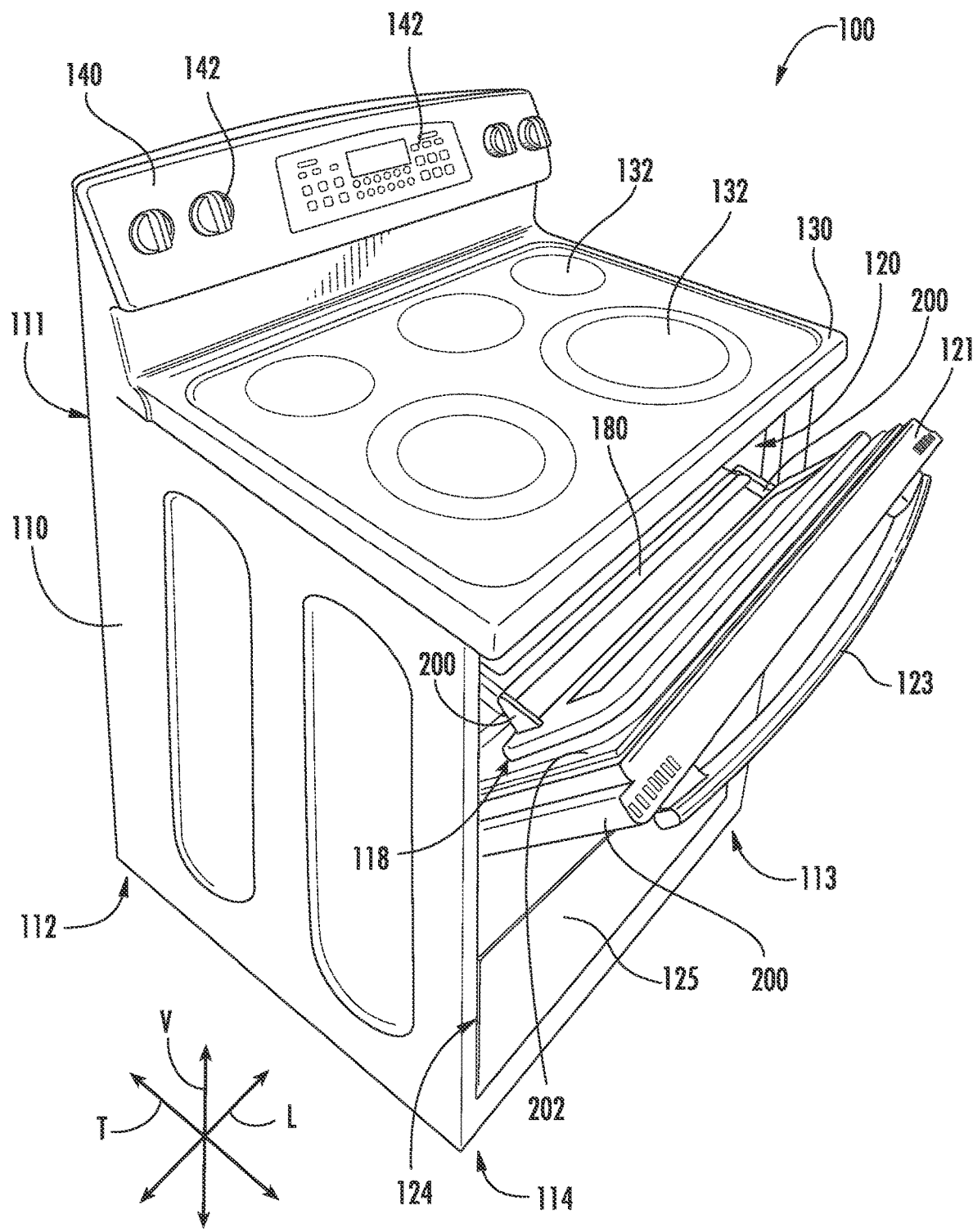
FIG. 2 is a perspective view of an oven appliance, with a door of the oven appliance opened, in accordance with one embodiment of the present disclosure.

FIGS. 1 and 2 provide perspective views of an oven appliance 100 according to exemplary embodiments of the present disclosure. Oven appliance 100 defines a vertical direction V, a lateral direction L and a transverse direction T. The vertical, lateral and transverse directions are mutually perpendicular and form an orthogonal direction system.

Oven appliance 100 may include an insulated cabinet 110. Cabinet 110 may extend between a top portion 111 and a bottom portion 112, e.g., along the vertical direction V. Thus, top and bottom portions 111, 112 of cabinet 110 may be spaced apart from each other, e.g., along the vertical direction V. Cabinet 110 may also extend between a first side portion 113 and a second side portion 114, e.g., along the lateral direction L. Thus, first and second side portions 113, 114 of cabinet 110 may be spaced apart from each other, e.g., along the lateral direction L. Cabinet 110 may further extend between a front portion 115 and a back portion 116, e.g., along the transverse direction T. Thus, front and back portions 115, 116 of cabinet 110 may be spaced apart from each other, e.g., along the transverse direction T.

Oven appliance 100 may include a cooktop 130 positioned at or adjacent top portion 111 of cabinet 110. Cooktop 130 may include various heating elements 132, such as gas burners, electric resistance elements, induction elements, etc., that are configured for heating cookware positioned thereon. As may be seen in FIG. 1, cabinet 110 may also define an upper cooking chamber 120 and a lower cooking chamber 124. Thus, oven appliance 100 may be referred to as a double oven range appliance. As will be understood by those skilled in the art, oven appliance 100 is provided by way of example only, and the present subject matter may be used in any suitable oven appliance, e.g., a single oven range appliance, a single wall oven appliance, a double wall oven appliance, etc.

Upper cooking chamber 120 may be positioned at or adjacent top portion 111 of cabinet 110. Conversely, lower cooking chamber 124 may be positioned at or adjacent bottom portion 112 of cabinet 110. Thus, upper and lower cooking chambers 120, 124 may be spaced apart from each other along the vertical direction V. Upper and lower cooking chambers 120, 124 may have any suitable size relative to each other. For example, as shown in FIG. 1, upper cooking chamber 120 may be smaller than lower cooking chamber 124.

Upper and lower cooking chambers 120, 124 may be configured for receipt of one or more food items to be cooked. Oven appliance 100 may include an upper door 121 and a lower door 125 that are attached or coupled to cabinet 110, e.g., with slide assemblies and hinges, etc., in order to permit selective access to upper cooking chamber 120 and lower cooking chamber 124, respectively. Handles 123, 127 may be mounted to upper and lower doors 121, 125 to assist a user with opening and closing doors 121, 125 in order to access cooking chambers 120, 124. As an example, a user may pull on handle 123 mounted to upper door 121 to open or close upper door 121 and access upper cooking chamber 120. Glass window panes 122, 126 provide for viewing the contents of upper and lower cooking chambers 120, 124 when doors 121, 125 are closed and also assist with insulating upper and lower cooking chambers 120, 124. Heating elements such as electric resistance heating elements, gas burners, microwave elements, etc., may be positioned within upper and lower cooking chambers 120, 124 of cabinet 110 for heating upper and lower cooking chambers 120, 124.

A control panel 140 of oven appliance 100 may be positioned at top portion 111 and back portion 116 of cabinet 110. Control panel 140 may include user inputs 142. Control panel 140 may provide selections for user manipulation of the operation of oven appliance 100. For example, a user may touch control panel 140 to trigger one of user inputs 142. In response to user manipulation of user inputs 142, various components of the oven appliance 100, such as the heating elements, may be operated.

As may be seen in FIG. 2, cabinet 110 may define an opening 118 for accessing upper cooking chamber 120 of cabinet 110. Upper door 121 may be positioned at or adjacent opening 118 of cabinet 110 when upper door 121 is in the closed position. Conversely, at least a portion of upper door 121 may be spaced apart from cabinet 110, e.g., opening 118 of cabinet 110, along the transverse direction T when upper door 121 is in the open position.

When upper door 121 is in the closed position as shown in FIG. 1, upper door 121 seals or closes upper cooking chamber 120. Thus, such position and orientation of upper door 121 may be used when cooking food items within upper cooking chamber 120. If a user wants to check on the food items, the user may open upper door 121 (as illustrated in FIG. 2) in order to allow the user to view and observe the food items within upper cooking chamber 120.

A door such as door 121 (and/or door 125) may be formed from various components. For example, as shown, door 121 may include a front panel assembly 200 and a liner which may define an interior of the door therebetween. The front panel assembly 200 may include an outer panel of the door 121. A window pane 122 may be disposed within a window opening defined in the outer panel. Handle 123 may extend from the front panel assembly 200. The liner may be a separate component coupled to the front panel assembly 200 to form the door 121. The liner may include inner portions of the door 121 which are subjected to high temperatures in the cooking chamber 120 (or 124) during operation.

Oven appliance 100 may also include a rack assembly 180 that includes features for supporting food items thereon. Rack assembly 180 may be slidably coupled to cabinet 110 such that rack assembly 180 may move along the transverse direction T.

Figure 3:
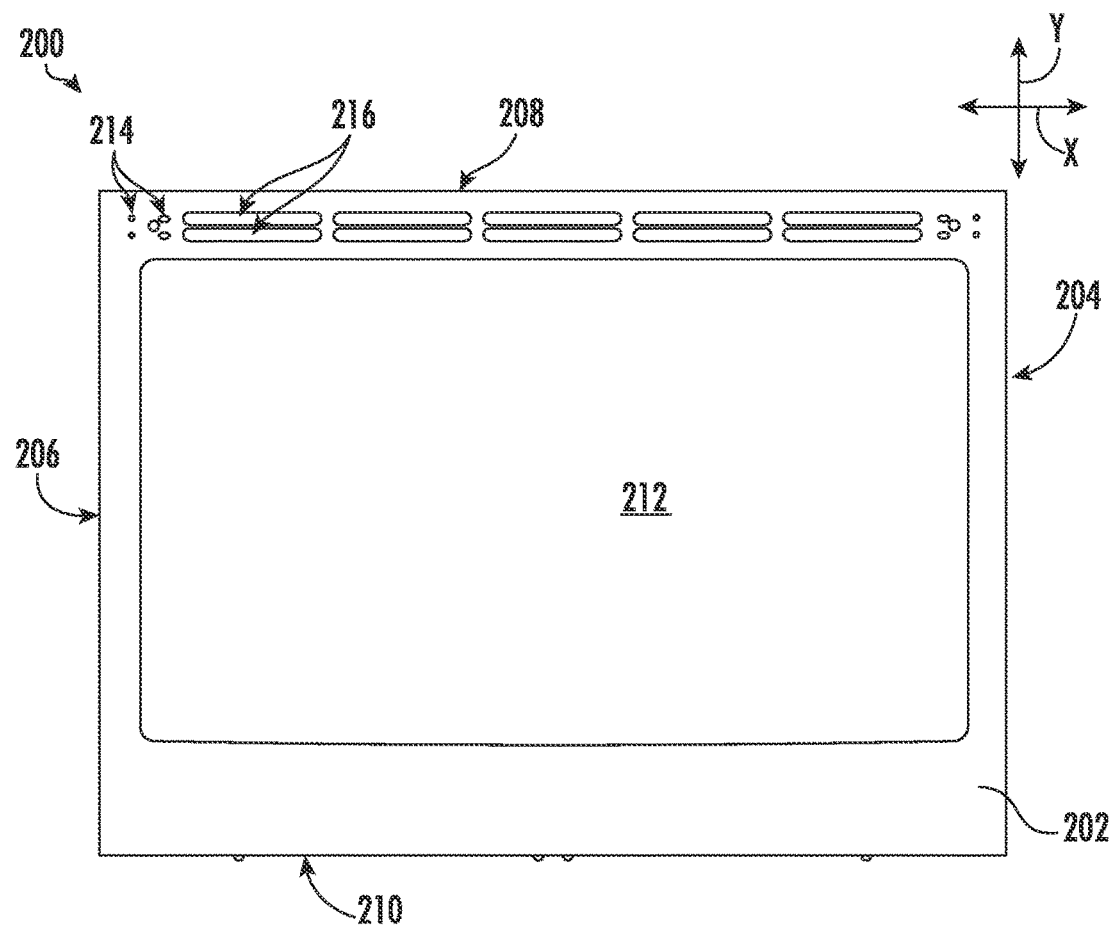
FIG. 3 is a front view of a front oven door panel assembly in accordance with one embodiment of the present disclosure.
Figure 4:
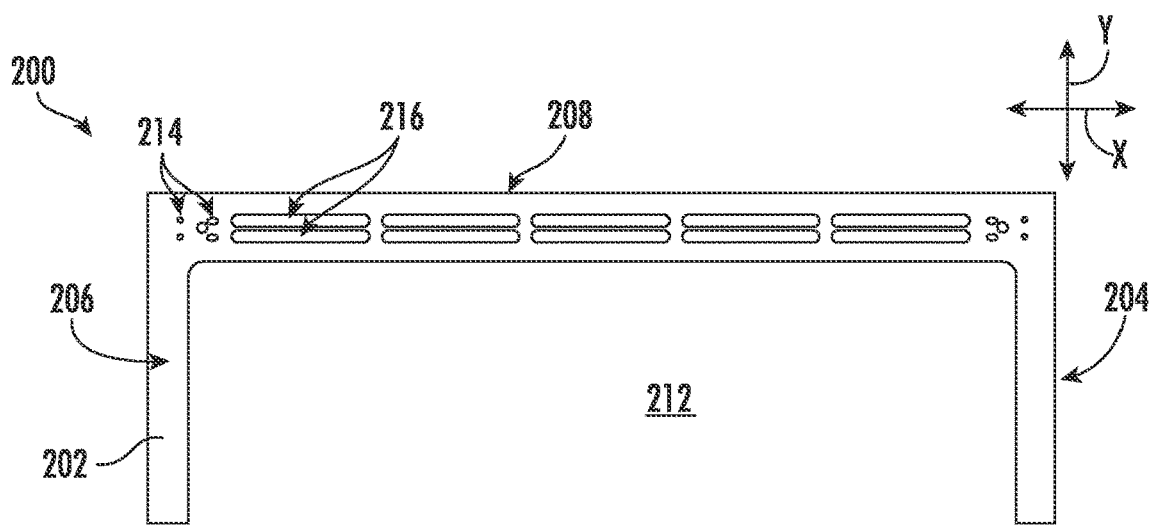
FIG. 4 is a front view of a front oven door panel assembly in accordance with another embodiment of the present disclosure.

Referring now to FIGS. 3 and 4, embodiments of a front panel assembly 200, which may for example be a front panel assembly of door 121 or door 125 of an oven appliance 100, are provided. FIG. 3 illustrates a full front panel assembly, which FIG. 4 illustrates a partial front panel assembly.

Front panel assembly 200 may include a main panel 202, which may for example be the front or outer panel thereof. Front panel assembly 200 may further include a plurality of side panels, such as a right side panel 204, left side panel 206, top side panel 208, and/or bottom side panel 210. The panel assembly 200 may define an X-axis, a Y-axis, and a Z-axis. The axes are mutually perpendicular and form an orthogonal coordinate system. Main panel 202 may extend within a plane that defines the X- and Y-axes, while the various side panels 204, 206, 208, 210 may extend from the main panel 202 generally along the Z-axis. Additionally, panels 204 and 206 may be generally parallel to each other, and panels 208 and 210 may be generally parallel to each other and generally perpendicular to panels 204 and 206.

Various openings may additionally be defined in the main panel 202. For example, a window opening 212 may be defined in the main panel 202 for accommodating one or more windowpanes therein. Handle openings 214 may be defined for extending mechanical fasteners therethrough to connect a handle to the front panel assembly 200. Vent openings 216 may be provided to vent air from the oven appliance 100 during operation.

Figure 5:
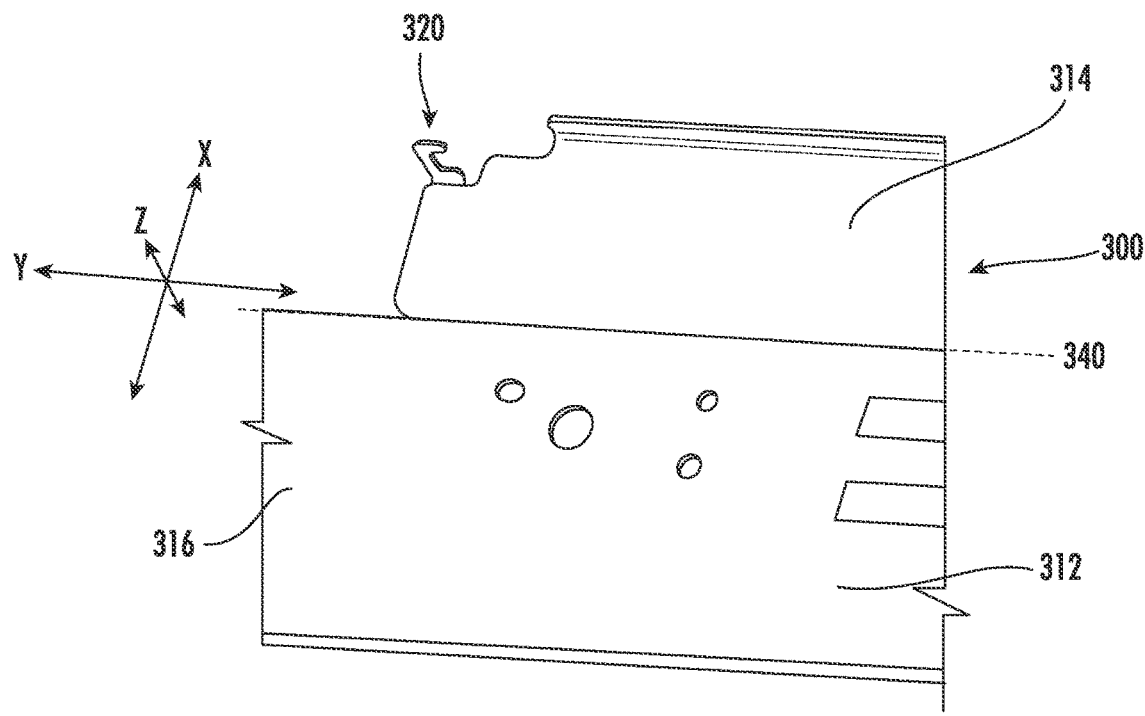
FIG. 5 is a front partial perspective view of an unformed panel assembly in accordance with one embodiment of the present disclosure.
Figure 7:
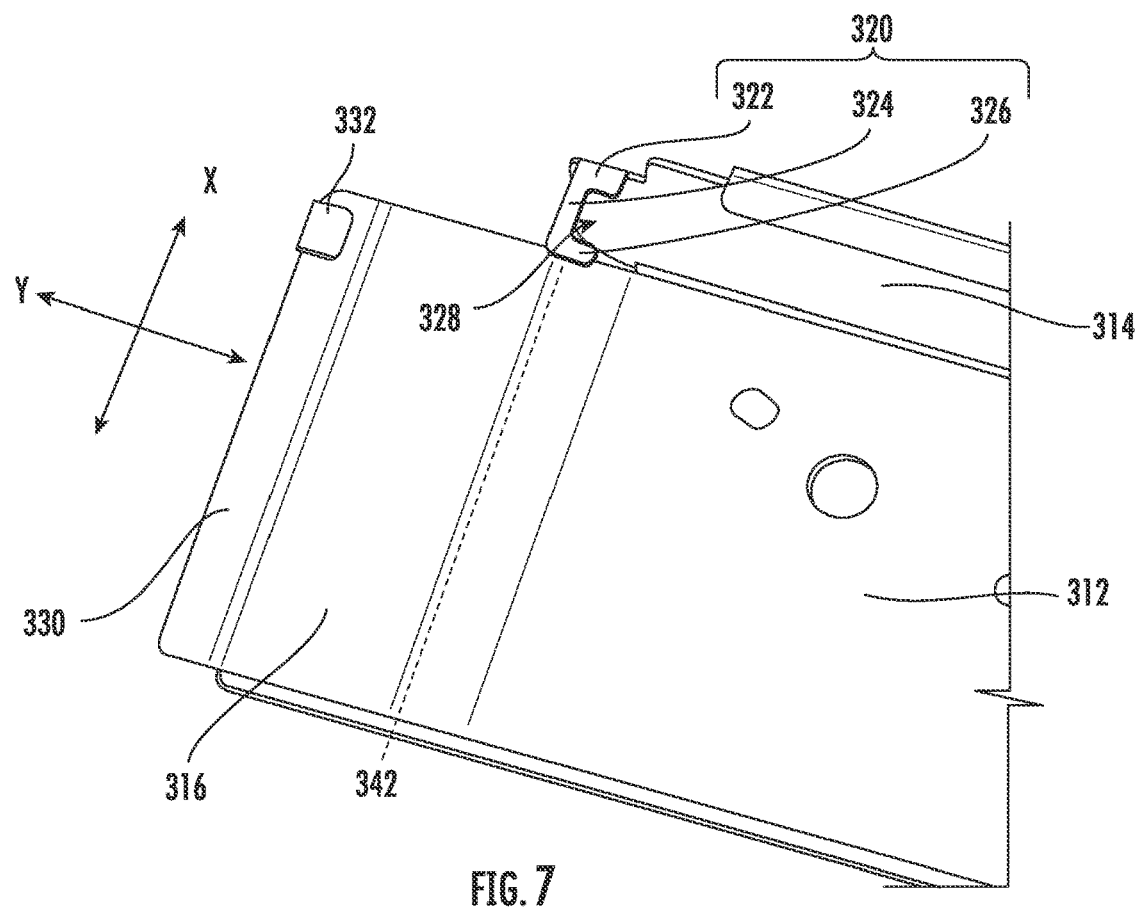
FIG. 7 is a front partial perspective view of an unformed panel assembly during formation into a panel assembly in accordance with one embodiment of the present disclosure.
Figure 8:
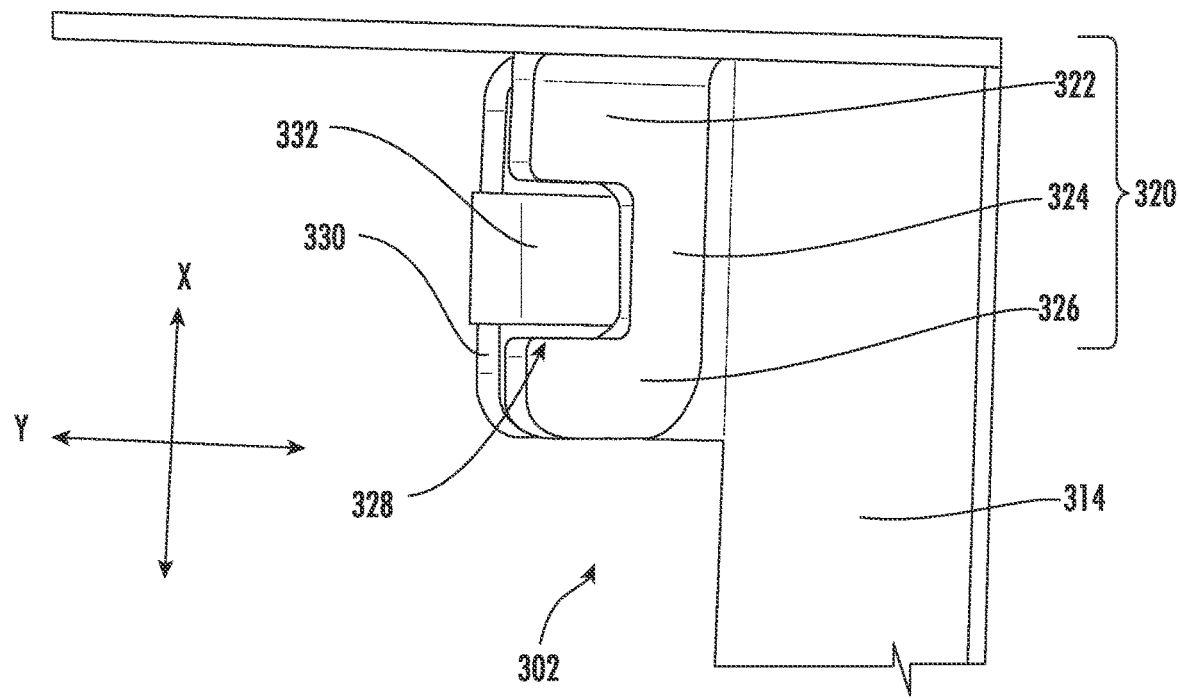
FIG. 8 is a perspective view of a formed panel assembly in accordance with one embodiment of the present disclosure.
Figure 9:
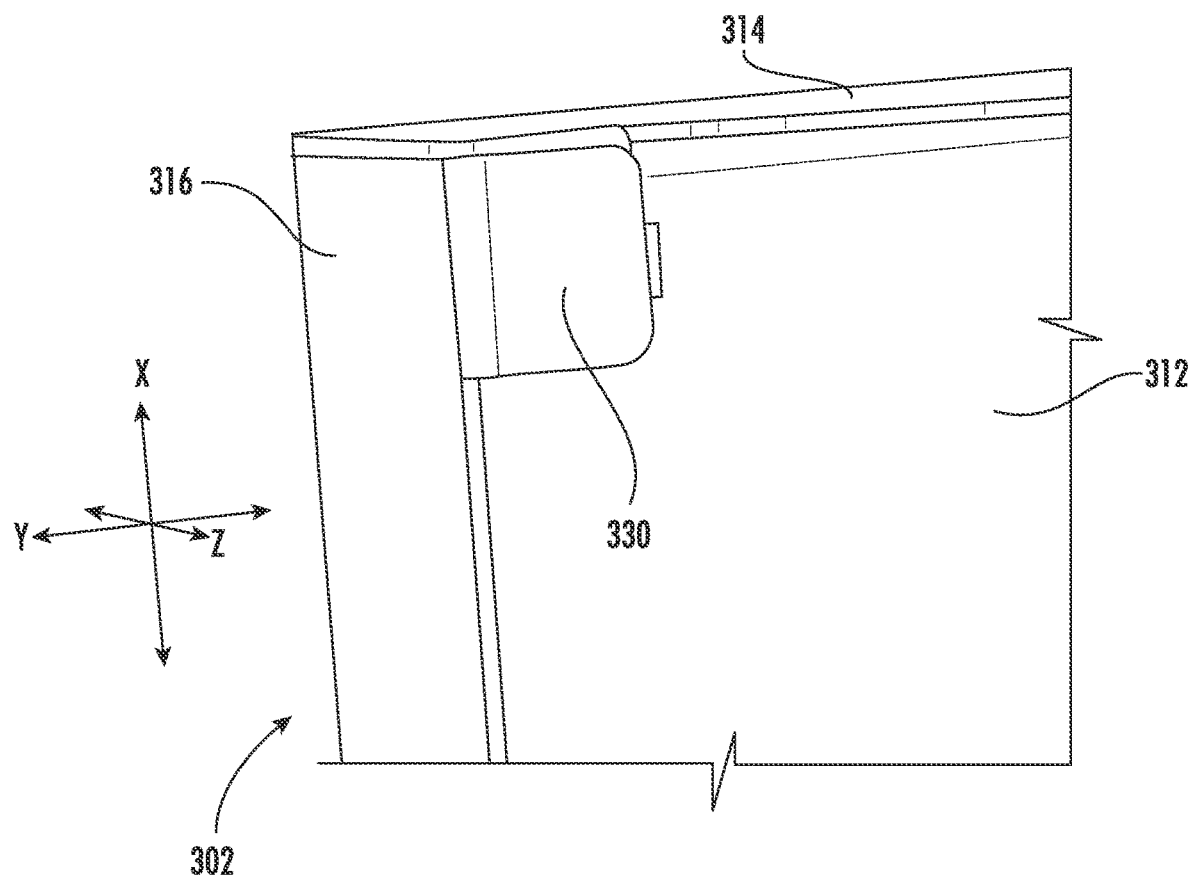
FIG. 9 is a perspective view of a formed panel assembly in accordance with one embodiment of the present disclosure.

FIGS. 5 through 9 illustrate portions of an exemplary panel assembly at various stages during formation thereof. For example, FIG. 5 illustrates portions of an unformed panel assembly 300, i.e. before formation into a usable panel assembly [e.g., front panel assembly 200 (FIG. 3) or formed panel assembly 302]. FIG. 9 illustrates a formed panel assembly 302. In some embodiments, panel assembly 302 is a front panel assembly 200 for a door 121, 125 of an oven appliance 100 and unformed panel assembly 300 is an unformed front panel assembly 200 for a door 121, 125 of an oven appliance 100. However, it should be understood that panel assemblies 302 in accordance with the present are not limited to such embodiments. Rather, panel assemblies 302 in accordance with the present disclosure may be utilized as components in any suitable doors or other assemblies for any suitable appliances or other applications.

As illustrated in FIG. 5, an unformed panel assembly 300 includes a main panel 312, a first side panel 314, and a second side panel 316. The main panel 312 extends within a plane which defines an X-axis and a Y-axis. The first side panel 314 extends generally within the X-Y plane from the main panel 312 along the X-axis, while the second side panel 316 extends generally within the X-Y plane from the main panel 312 along the Y-axis. Accordingly, first side panel 314 and second side panel 316 are generally perpendicular to each other.

Further, a first tab 320 may extend from the first side panel 314, and a second tab 330 may extend from the second side panel 316. Additionally or alternatively, main panel 312, first side panel 314, second side panel 316, first tab 320, and second tab 330 may be integrally formed as a monolithic structure. The tabs may advantageously be utilized to join the first side panel 314 and second side panel 316 together during formation of the panel assembly 302 from the unformed panel assembly 300. Use of such tabs advantageously eliminates the need for a secondary joining process to join the side panels 314, 316, such that no secondary joining of the side panels 314, 316 is performed. A secondary joining process may be any process wherein an additional discrete fastening component, such as a mechanical fastener, a welding or brazing filler, etc., and/or additional alteration to the properties of the side panels 314, 316, such as melting, etc., is utilized to join the side panels 314, 316. Accordingly, formation of a panel assembly 302 in accordance with the present disclosure may advantageously be relatively more efficient and cost-effective.

First tab 320 extends from first side panel 314. As shown in FIG. 5, first tab 320 may extend from first side panel 314 along the Z-axis, perpendicular to the X-Y plane. In some embodiments, in an unformed panel (e.g., unformed panel 300), first tab 320 extends from first side panel 314 along the X-axis (and thus in the X-Y plane). Subsequently, first tab 320 may be bent to extend along the Z-axis, as shown in FIG. 5. As shown more clearly in FIGS. 7 and 8, first tab 320 may include a first portion 322, a second portion 324, and a third portion 326. First portion 322 may extend predominantly in the Y-direction (i.e., the direction of the Y-axis). In other words, first portion 322 may be longer in the Y-direction than in the X-direction (i.e., the direction of the X-axis) (e.g., in the formed panel 302 shown in FIG. 8). First portion 322 may extend directly from first side panel 314. In detail, the long edge (e.g., Y-direction edge) of first portion 322 may be attached to first side panel 314. First tab 320 (e.g., first portion 322) may be integral with first side panel 314. Additionally or alternatively, each of first portion 322, second portion 324, and third portion 326 may lie in the same plane (e.g., the X-Y plane) in the unformed panel 300. In other words, first portion 322, second portion 324, and third portion 326 may be continuous (e.g., a single planar piece).

Turning especially to FIG. 8, second portion 324 may extend from first portion 322. In the formed panel 302, second portion 324 may extend predominantly in the X-direction from first portion 322. Accordingly, second portion 324 may be longer in the X-direction than in the Y-direction. Second portion 324 may be predominantly perpendicular to first portion 322 in the X-Y plane. For instance, first portion 322 may extend predominantly in the Y-direction while second portion 324 extends predominantly in the X-direction. Second portion 324 may be integral with first portion 322. Thus, second portion 324 may be integral with first side panel 314.

Remaining especially with FIG. 8, third portion 326 may extend from second portion 324. In the formed panel 302, third portion 326 may extend predominantly in the Y-direction from second portion 324. Accordingly, third portion 326 may be longer in the Y-direction than in the X-direction. Further, third portion 326 may be parallel with and spaced apart from first portion 322 in the X-Y plane. Accordingly, third portion 326 may be longer in the Y-direction than in the X-direction. Third portion may be predominantly perpendicular to second portion 324 in the X-Y plane. Third portion 326 may be integral with second portion 324. Thus, third portion 326 may be integral with first side panel 314.

When assembled, first tab 320 may form a "C" shape. In other words, first portion 322, second portion 324, and third portion 326 may collectively define a notch 328. Notch 328 may be formed such that a side of first tab 320 is open in the Y-direction (e.g., in the formed panel 302 shown in FIG. 8). In some embodiments, notch 328 is open toward a center of formed panel assembly 302 (e.g., as shown in FIG. 8). Additionally or alternatively, first tab 320 may form a block-0 shape. For example, first tab 320 may include a fourth portion (not shown) that connects the first portion 322 to the third portion 326. Accordingly, notch 328 may be a through hole defined in the Z-direction by first portion 322, second portion 324, third portion 326, and the fourth portion (not shown).

Second tab 330 may extend from the second side panel 316. For example, turning especially to FIG. 6, in the unformed panel 300, second tab 330 may extend from second side panel 316 in the Y-direction. Further, second tab 330 may extend in the X-direction along an edge of second side panel 316. For instance, second tab 330 may have a predetermined length in the X-direction. In some embodiments, a length of second tab 330 in the X-direction is equal to a length of second side panel 316 in the X-direction. In exemplary embodiments, the length of second tab 330 in the X-direction is shorter than the length of second side panel 316 in the X-direction (e.g., as shown in FIGS. 8 and 9). Second tab 330 may be planar. Moreover, when assembled, second tab 330 may lie in the X-Y plane (e.g., in formed panel 302 as shown in FIGS. 8 and 9).

Figure 6:
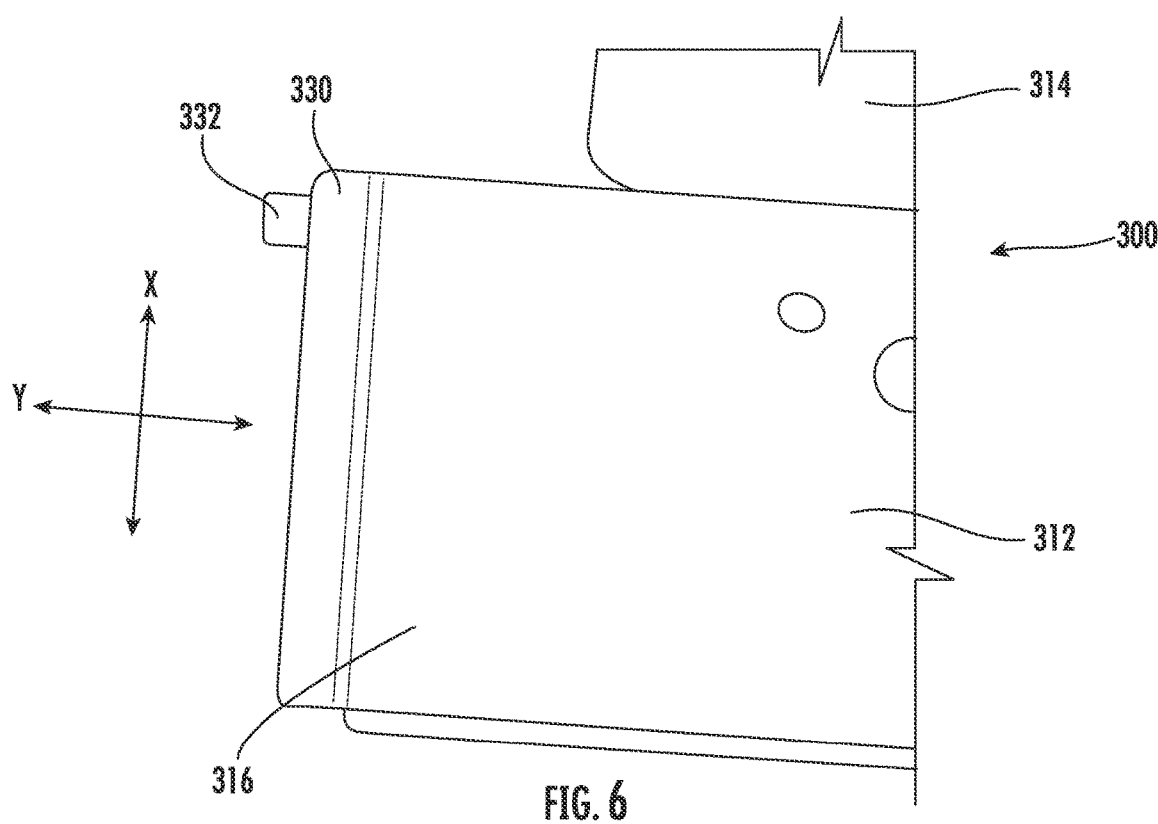
FIG. 6 is a front partial perspective view of an unformed panel assembly in accordance with one embodiment of the present disclosure.

An extension 332 may extend from second tab 330. As shown in FIG. 6, extension 332 may extend from second tab 330 in the Y-direction. Extension 332 may also extend in the X-direction (e.g., to form a tab). As best shown in FIG. 7, extension 332 may be folded 180° toward second tab 330, such that extension 332 overlaps second tab 330. Thus, extension 332 may project in the Z-direction (i.e., in the direction of the Z-axis) (e.g., on formed panel assembly 302 as shown in FIGS. 8 and 9).

As shown especially in FIG. 8, extension 332 may have a predefined length and width in the X-direction and Y-direction, respectively, in the formed panel assembled 302. For instance, extension 332 may be sized so as to be accommodated within notch 328 (e.g., in formed panel assembly 302 as shown in FIG. 8). Advantageously, first side panel 314 is restricted from moving laterally in the Y-direction, and second side panel 316 is restricted from moving vertically in the X-direction. Accordingly, formed panel assembly 302 may remain sufficiently restrained without requiring additional fastening or alteration. Additionally or alternatively, the formation of first tab 320 and second tab 330 may be completed using a single die, press, or bending machine.

In producing formed panel assembly 302, various bends are performed to first side panel 314, second side panel 316, first tab 320, second tab 330, and extension 332. For example, as shown in FIG. 5, first side panel 314 may be bent along first bending axis 340. First side panel 314 may be bent 90° along first bending axis 340. Accordingly, first side panel 314 may extend in the Z-axis direction on formed panel assembly 302. Moreover, first tab 320 may extend in the X-axis direction on formed panel assembly 302.

Similarly, as shown in FIG. 7, second side panel 316 may be bent along second bending axis 342. Second side panel 316 may be bent 90° along second bending axis 342. Accordingly, second side panel 316 may extend in the Z-axis direction on formed panel assembly 302. Moreover, second tab 330 (and extension 332) may extend in the Y-axis direction on formed panel assembly 302. On formed panel 302, second tab 330 may overlap first tab 320 in the Z-axis direction. Additionally or alternatively, on formed panel 302, extension 332 may be coplanar with first tab 320 in the X-Y plane.

Notably, in exemplary embodiments, the various components of unformed panel assembly 300 and resulting formed panel assembly 302, such as the main panel 312, side panels 314, 316, first tab 320 and second tab 330, are formed from a suitable metal, such as aluminum, brass, copper, steel, tin, nickel, titanium, etc. Further, as illustrated, the various components of unformed panel assembly 300 and resulting formed panel assembly 302, such as the main panel 312, side panels 314, 316, first tab 320 and second tab 330, are integrally formed as monolithic structure.

Figure 10:
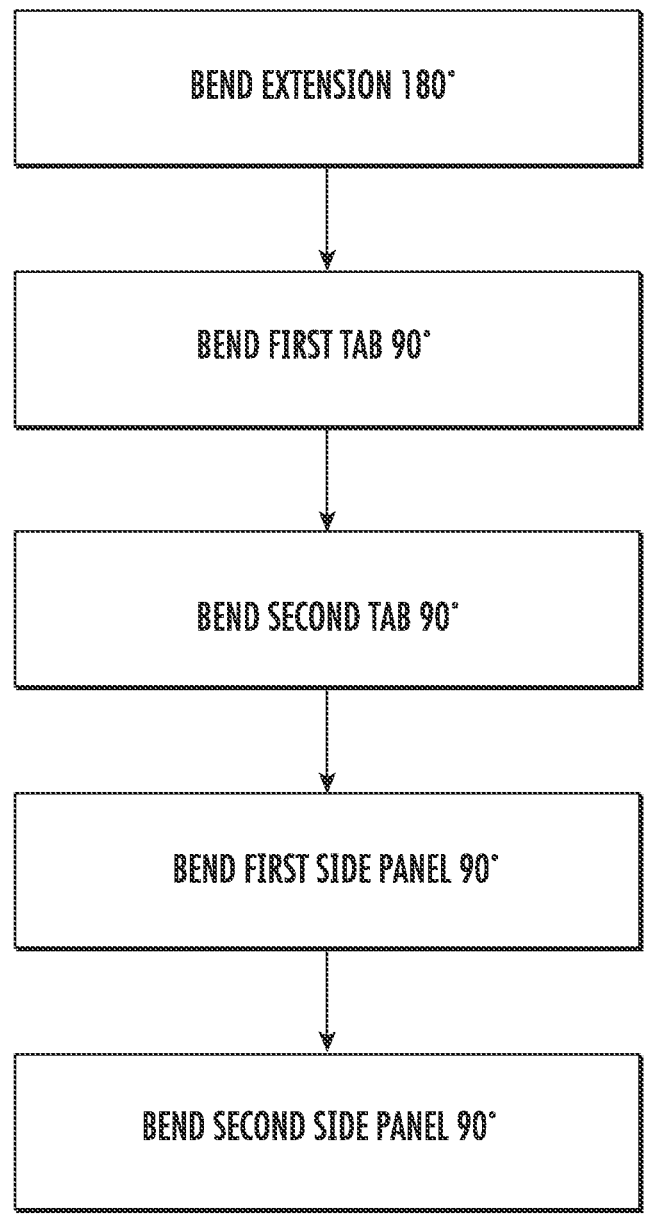
FIG. 10 is a flowchart illustrating a method of forming a panel assembly.

Referring now to FIG. 10, a method 400 of forming a panel assembly (e.g., formed panel assembly 302 or front panel assembly 200) will be discussed. Method 400 may commence with receiving an unformed panel assembly (e.g., unformed panel assembly 300). The unformed panel assembly may feature a first side panel, a second side panel, a first tab extending from the first side panel, a second tab extending from the second side panel, and an extension extending from the second tab. At step 402, method 400 may include bending the extension 180°. As described above and seen best in FIGS. 7 and 8, the extension may thus overlap with the second tab. Accordingly, the extension may project in the Z-direction (e.g., on an unformed panel assembly).

At step 404, method 400 may include bending the first tab such that the first tab extends from the first side panel along the Z-axis. With reference to FIG. 5, the first tab may be bent 90° such that the first tab is perpendicular to the first side panel.

At step 406, method 400 may include bending the second tab such that the second tab extends from the second side panel along the Z-axis. Similar to the first tab, the second tab may be bent 90° such that the second tab is perpendicular to the second side panel.

At step 408, method 400 may include bending the first side panel such that the first side panel extends from the main panel along the Z-axis. Accordingly, the first tab would now extend in the X-direction. Further, the first tab would be parallel with the main panel. Additionally or alternatively, the first tab may be spaced apart from the main panel. For example, the first tab is spaced apart from the main panel by a distance equal to a width of the first side panel.

At step 410, method 400 may include bending the second side panel such that the second side panel extends from the main panel along the Z-axis. Accordingly, the second tab would now extend in the Y-direction. Further, the second tab would be parallel with the main panel and the first tab. Additionally or alternatively, the second tab may be spaced apart from the main panel. For example, the second tab is spaced apart from the main panel by a distance equal to a width of the second side panel.

Consequently, the second tab may overlap the first tab. Additionally or alternatively, the extension may be positioned between a first portion, a second portion, and a third portion of the first tab. In other words, the first tab may have a "C" shape. Therefore, the extension may be positioned within the "C" shape of the first tab after completion of step 410. It should be understood that the steps of method 400 may be performed in any suitable order such that the extension is positioned between the first portion, second portion, and third portion of the first tab.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A panel assembly, comprising:
a main panel extending within a plane which defines an X-axis and a Y-axis perpendicular to the X-axis;
a first side panel extending from the main panel along a Z-axis perpendicular to the X-axis and the Y-axis;
a second side panel extending from the main panel along the Z-axis, the second side panel perpendicular to the first side panel;
a first tab extending from the first side panel along the X-axis and comprising a first portion, a second portion, and a third portion, the first, second, and third portions lying in the same plane and collectively defining a notch;
a second tab extending from the second side panel along the Y-axis; and
an extension extending from the second tab in the Y-axis direction, the extension interlocking with the notch, wherein the second tab is parallel with the first tab along the X-axis and Y-axis, and the second tab overlaps the first tab along the Z-axis such that the extension is co-planar with the first tab along the X-axis and the Y-axis.

2. The panel assembly of claim 1, wherein the extension is bent 180° from a distal edge of the second tab such that the extension overlaps with the second tab.

3. The panel assembly of claim 1, wherein the first portion, the second portion, and the third portion collectively form a "C" shape to define the notch.

4. The panel assembly of claim 1, wherein the first tab overlaps the second tab in the Z-axis direction.

5. The panel assembly of claim 1, wherein the main panel, first side panel, second side panel, first tab and second tab are integrally formed such that the panel assembly is a monolithic structure.

6. The panel assembly of claim 1, wherein the wherein the main panel, first side panel, second side panel, first tab, and second tab are formed from a metal.

7. The panel assembly of claim 1, wherein no secondary joining of the first side panel and the second side panel is performed.

8. The panel assembly of claim 1, wherein the second portion of the first tab is located between the second side panel and the extension in the Y-axis direction.

9. The panel assembly of claim 1, wherein the extension is coplanar with the first tab in the X-Y plane.

10. A method of forming a panel assembly, the method comprising:
receiving an unformed panel assembly, the unformed panel assembly comprising a main panel extending within a plane which defines an X-axis and a Y-axis perpendicular to the X-axis, a first side panel extending within the plane from the main panel along the X-axis, and a second side panel extending within the plane from the main panel along the Y-axis, the unformed panel assembly further comprising a first tab extending from the first side panel, the first tab comprising a first portion extending from the first side panel along the X-axis, a second portion extending from the first portion in the X-axis, and a third portion extending from the second portion in the Y-axis, the unformed panel assembly further comprising a second tab extending from the second side panel along the Y-axis, the second tab comprising an extension extending from the second tab along the Y-axis;
bending the extension 180° such that the extension overlaps with the second tab;
bending the first tab such that the first tab extends from the first side panel along a Z-axis perpendicular to the X-axis and the Y-axis;
bending the second tab such that the second tab extends from the second side panel along the Z-axis;
bending the first side panel such that the first side panel extends from the main panel along the Z-axis; and
bending the second side panel such that the second side panel extends from the main panel along the Z-axis and the extension is positioned between the first portion, the second portion, and the third portion of the first tab, wherein the second tab is parallel with the first tab along the X-axis and Y-axis, and the second tab overlaps the first tab along the Z-axis such that the extension is co-planar with the first tab along the X-axis and the Y-axis.

11. The method of claim 10, wherein the first portion, the second portion, and the third portion of the first tab form a "C" shape.

12. The method of claim 10, wherein the first tab overlaps the second tab in the Z-axis direction.

13. The method of claim 10, wherein the main panel, first side panel, second side panel, first tab and second tab are integrally formed such that the panel assembly is a monolithic structure.

14. The method of claim 10, wherein the wherein the main panel, first side panel, second side panel, first tab, and second tab are formed from a metal.

15. The method of claim 10, wherein no secondary joining of the first side panel and the second side panel is performed.

16. The method of claim 10, wherein the second portion of the first tab is located between the second side panel and the extension in the Y-axis direction.

17. The method of claim 10, wherein the extension is coplanar with the first tab in the X-Y plane.

18. The method of claim 10, wherein the unformed panel assembly is an unformed front oven door panel assembly.

* * * * *